(12) United States Patent
Saeki et al.

(10) Patent No.: US 8,288,469 B2
(45) Date of Patent: Oct. 16, 2012

(54) RUBBER COMPOSITION AND HEAVY DUTY PNEUMATIC TIRE USING THE SAME

(75) Inventors: Yasuyuki Saeki, Kodaira (JP); Asami Tajima, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 583 days.

(21) Appl. No.: 12/440,941

(22) PCT Filed: Sep. 14, 2007

(86) PCT No.: PCT/JP2007/067994
§ 371 (c)(1),
(2), (4) Date: Jan. 13, 2010

(87) PCT Pub. No.: WO2008/032836
PCT Pub. Date: Mar. 20, 2008

(65) Prior Publication Data
US 2011/0041976 A1  Feb. 24, 2011

(30) Foreign Application Priority Data

Sep. 14, 2006 (JP) .................. 2006-249126
Sep. 14, 2007 (JP) .................. 2007-239794

(51) Int. Cl.
*B60C 9/28* (2006.01)
*C08L 7/00* (2006.01)
*A61K 9/16* (2006.01)
*C08F 36/00* (2006.01)

(52) U.S. Cl. ......... 524/543; 526/335; 152/538; 523/156

(58) Field of Classification Search ............ 524/543; 526/335; 152/538; 523/156
See application file for complete search history.

(56) References Cited

FOREIGN PATENT DOCUMENTS

| | | | |
|---|---|---|---|
| EP | 1195402 A1 | | 4/2002 |
| EP | 1 466 942 | * | 10/2004 |
| EP | 1466942 A1 | | 10/2004 |
| JP | 2005-041975 A | | 2/2005 |
| JP | 2005-082766 A | | 3/2005 |
| JP | 2005-307172 A | | 11/2005 |

* cited by examiner

*Primary Examiner* — William Cheung
(74) *Attorney, Agent, or Firm* — Sughrue Mion, PLLC

(57) ABSTRACT

This invention relates to a rubber composition capable of improving wear resistance without losing low heat buildup and a heavy duty pneumatic tire in which the low heat buildup and the wear resistance are simultaneously established, and more particularly to a rubber composition characterized by comprising 40 to 60 parts by mass of a carbon black based on 100 parts by mass of a rubber component composed of natural rubber and a diene-based synthetic rubber and satisfying a relation of the following formula (1):

$$\Delta E' < 0.29 \times A - 11 \qquad (1)$$

[wherein $\Delta E'$ is a difference between a storage modulus (MPa) at a strain of 0.1% and a storage modulus (MPa) at a strain of 2% measured at 25° C., and A is an amount (parts by mass) of the carbon black compounded based on 100 parts by mass of the rubber component] and a heavy duty pneumatic tire characterized by using the rubber composition in a tread.

9 Claims, No Drawings though being contradictory to each other can be simultaneously established by optimizing the ΔE' and the amount of the carbon black compounded of the rubber composition used in the tread of the tire.

RUBBER COMPOSITION AND HEAVY DUTY PNEUMATIC TIRE USING THE SAME

TECHNICAL FIELD

This invention relates to a rubber composition and a heavy duty pneumatic tire using the rubber composition in a tread, and more particularly to a rubber composition for a tread capable of improving wear lifetime without losing low heat buildup of a heavy duty tire.

BACKGROUND ART

Recently, a tire with an improved wear resistance without losing low heat buildup is required as a heavy duty pneumatic tire used in a truck, a bus or the like from a viewpoint of low fuel consumption and a lifetime of the tire.

In this regard, there may be employed a method wherein a rubber composition compounded with an increased amount of carbon black as a filler or a rubber composition using carbon black having a smaller particle size is used in a tread of a tire in order to improve the wear resistance of the tire. In this case, the wear resistance of the tire is indeed improved, but the low heat buildup of the tire is drastically deteriorated and thereby fuel economy of the tire gets worse.

Also, there may be employed a method wherein a glass transition point (Tg) of a rubber component of a rubber composition used in a tread is raised in order to reduce a wear energy. In this case, the wear resistance of the tire is also indeed improved, but the low heat buildup of the tire is drastically deteriorated and thereby the fuel economy of the tire gets worse.

On the other hand, dispersibility of carbon black as a filler can be improved by using in a tread of a tire a rubber composition using as a rubber component a butadiene-based polymer formed by modifying its terminal to improve the wear resistance of the tire (see JP-A-2005-41975). In this case, there is, however, a problem that the low heat buildup of the tire is also deteriorated.

DISCLOSURE OF THE INVENTION

It is, therefore, an object of the invention to solve the above-mentioned problems of the conventional techniques and to provide a rubber composition capable of improving the wear resistance without losing the low heat buildup. Also, it is anther object of the invention to provide a heavy duty pneumatic tire using such a rubber composition in a tread, in which the low heat buildup and the wear resistance are simultaneously established.

The inventors have made various studies in order to achieve the above objects and discovered that the low heat buildup and the wear resistance of the tire can be simultaneously established by using in a tread of a heavy duty pneumatic tire a rubber composition comprising a specified amount of carbon black, wherein the amount of the carbon black compounded and ΔE' under a specified condition satisfy a specified relationship, and as a result the invention has been accomplished.

That is, the rubber composition according to the invention is characterized by comprising 40 to 60 parts by mass of a carbon black based on 100 parts by mass of a rubber component composed of natural rubber and a diene-based synthetic rubber and satisfying a relation of the following formula (1):

$$\Delta E' < 0.29 \times A - 11 \quad (1)$$

[wherein ΔE' is a difference between a storage modulus (MPa) at a strain of 0.1% and a storage modulus (MPa) at a strain of 2% measured at 25° C., and A is an amount (parts by mass) of the carbon black compounded based on 100 parts by mass of the rubber component].

The rubber composition according to the invention is preferable to have a loss tangent (tan δ) at 25° C. of not higher than 0.166 and/or a glass transition point (Tg) of not lower than −50° C.

In the rubber composition according to the invention, it is preferable that the rubber component comprises a natural rubber obtained from a latex formed by partially removing protein from a natural rubber latex through a mechanical separation means and having a total nitrogen content of more than 0.1% by mass but not more than 0.4% by mass and polybutadiene rubber. Moreover, as the polybutadiene rubber is further preferable a modified polybutadiene rubber. Also, it is further preferable that the rubber component further comprises a modified styrene-butadiene copolymer rubber obtained through a solution polymerization.

In the rubber composition according to the invention, it is preferable that the carbon black comprises a carbon black in which a dibutyl phthalate (DBP) absorption number is 140 to 200 mL/100 g and a tint strength (Tint) and a nitrogen adsorption specific surface area ($N_2SA$) satisfy a relation of the following formula (2):

$$\text{Tint} \geq 0.100 \times N_2SA + 93 \quad (2).$$

Moreover, the carbon black further preferably comprises a carbon black in which a ratio (Dw/Dn) of a weight average diameter (Dw) to a number average diameter (Dn) of an aggregate is 1.80 to 2.40.

Also, the heavy duty pneumatic tire according to the invention is characterized by using the above-described rubber composition in a tread. Moreover, the heavy duty pneumatic tire preferably comprises a circumferential-direction belt containing a reinforcing cord arranged substantially in parallel to an equatorial plane of the tire.

According to the invention, there can be provided the rubber composition comprising the specified amount of the carbon black, satisfying the relation of the formula (1) and capable of improving the wear resistance without losing the low heat buildup. Also, there can be provided the heavy duty pneumatic tire using such a rubber composition in the tread, in which the low heat buildup and the wear resistance are simultaneously established.

BEST MODE FOR CARRYING OUT THE INVENTION

The invention will be described in detail below. The rubber composition according to the invention is characterized by comprising 40 to 60 parts by mass of a carbon black based on 100 parts by mass of a rubber component composed of natural rubber and a diene-based synthetic rubber and satisfying the above-described relation of the formula (1). Moreover, in the rubber composition according to the invention, a loss tangent (tan δ) at 25° C. is preferably not higher than 0.166, a glass transition point (Tg) is preferably not lower than −50° C. and the amount of the carbon black compounded is preferably 40 to 55 parts by mass based on 100 parts by mass of the rubber component.

As mentioned above, it is generally difficult to improve the wear resistance without losing the low heat buildup of the tire. In this context, the inventors have studied the ΔE' and the amount of the carbon black compounded of the rubber composition used in the tread of the tire, and the low heat buildup and the wear resistance of the tire, and as a result, discovered that the low heat buildup and the wear resistance of the tire can be improved by using in the tread the rubber composition wherein the ΔE' and the amount of the carbon black compounded satisfy the above-described relation of the formula (1).

The ΔE' defined in the present invention is an index of dispersibility of the carbon black and shows that the smaller the ΔE' is, the better the dispersibility of the carbon black is, and in this case, the wear resistance is improved. In particular, when the dispersibility of the carbon black is improved, a) tan δ of the rubber composition itself becomes small and b) there is no large lump of carbon black and thereby there is no core of breakage, and as a result, the wear resistance is improved. The loss tangent (tan δ) is sometimes used as an index of the dispersibility of the carbon black. However, the tan δ is a ratio of a loss modulus (E") to a storage modulus (E') and therefore does not directly (precisely) express the dispersibility itself of the carbon black. Therefore, the ΔE' is superior to the tan δ as an index of the dispersibility of the carbon black.

In the rubber composition according to the invention, when the ΔE' is not lower than (0.29×A−11), the dispersibility of the carbon black is bad and thereby the wear resistance and/or the low heat buildup are insufficient. Also, when the amount of the carbon black compounded is less than 40 parts by mass based on 100 parts by mass of the rubber component, the wear resistance of the tire is deteriorated, while when it exceeds 60 parts by mass, the low heat buildup of the tire is deteriorated. However, when the amount of the carbon black compounded is not more than 55 parts by mass based on 100 parts by mass of the rubber component, the low heat buildup of the tire can be sufficiently improved.

Further, the inventors have also studied Tg and tan δ at 25° C. of the rubber composition used in the tread of the tire, and the low heat buildup and the wear resistance of the tire, and as a result, discovered that the low heat buildup and the wear resistance of the tire can be further improved by using in the tread the rubber composition having a Tg of not lower than −50° C. and/or a tan δ at 25° C. of not higher than 0.166. In this context, when the Tg of the rubber composition is lower than −50° C., a tan δ at room temperature rises and the wear resistance tends to be deteriorated. Also, when the tan δ at 25° C. exceeds 0.166, the low heat buildup tends to be deteriorated.

The rubber component used in the rubber composition according to the invention is not particularly limited and can be selected from natural rubber and the diene-based synthetic rubber. As the diene-based synthetic rubber are concretely mentioned polyisoprene rubber (IR), styrene-butadiene copolymer rubber (SBR), polybutadiene rubber (BR) and the like. As the rubber component can be used any one of an unmodified rubber and a modified rubber. These rubber components may be used alone or in a combination of two or more. In order to make the rubber composition satisfy the above relation of the formula (1) and have a Tg of not lower than −50° C. and/or a tan δ of not higher than 0.166, it is preferable to use the after-mentioned partially deproteinized natural rubber, modified natural rubber, modified polybutadiene rubber, modified styrene-butadiene copolymer rubber being excellent in the low heat buildup, and the after-mentioned carbon black having a good dispersibility.

The rubber component of the rubber composition according to the invention preferably comprises a natural rubber obtained from a latex formed by partially removing protein from a natural rubber latex through a mechanical separation means and having a total nitrogen content of more than 0.1% by mass but not more than 0.4% by mass and polybutadiene rubber (BR). The partially deproteinized natural rubber is excellent in the low heat buildup and can lower the tan δ at 25° C. of the rubber composition. In this context, a content of the partially deproteinized natural rubber in the rubber component is preferably within a range of 30 to 100% by mass and a content of the polybutadiene rubber in the rubber component is preferably within a range of 10 to 70% by mass.

The above natural rubber can be obtained in the usual natural rubber production steps, i.e., steps of successively conducting tapping of latex, coagulation, washing, dehydration, drying and packing by subjecting the latex after the tapping and before the coagulation to a partial deproteinizing treatment through a mechanical separation means, preferably a centrifugal separation-concentration process so as to render the total nitrogen content in the solid component into the above-described range and then coagulating and washing the resulting natural rubber latex and further drying it with a usual drier such as vacuum drier, air drier, drum drier or the like. The natural rubber latex as a starting material is not particularly limited, and a field latex, commercially available latex and the like can be used.

As the deproteinizing treatment are also known a decomposition process using a proteolytic enzyme, a repetitive washing process using a surfactant, a process using the enzyme and the surfactant together or the like, and the protein in the solid rubber decreases through these methods but an effective component having an anti-oxidant action such as tocotrienol or the like is concurrently lost, so that the aging resistance inherent to the natural rubber lowers. To the contrary, the effective component such as tocotrienol or the like is not substantially lost through the mechanical separation means, so that the heat resistance can be maintained at a level approximately equal to that of the conventional natural rubber.

The total nitrogen content in the natural rubber is an indication of protein content, and can be controlled by adjusting centrifugal separation conditions of the starting natural rubber latex (revolution number, time and the like). In this regard, the centrifugal separation condition is not particularly limited, but it is preferable to repeat the operation at a revolution number of about 7500 rpm several times. When the total nitrogen content is not more than 0.1% by mass, the aging resistance lowers, while when it exceeds 0.4% by mass, the low heat buildup may not be obtained sufficiently. Moreover, the total nitrogen content in the natural rubber is preferably within a range of 0.2 to 0.4% by mass, more preferably within a range of 0.25 to 0.35% by mass.

The rubber component of the rubber composition according to the invention is also preferable to comprise a modified natural rubber containing a polar group in a natural rubber molecule and the polybutadiene rubber (BR). The modified natural rubber is high in the affinity for the carbon black as compared with an unmodified natural rubber. Therefore, when the rubber component comprises the modified natural rubber, the dispersibility of the carbon black into the rubber component is improved and the reinforcing effect of the carbon black is sufficiently developed to make the wear resistance significantly excellent and highly improve the low heat buildup. In this context, a content of the modified natural rubber in the rubber component is preferably within a range of 30 to 100% by mass and a content of the polybutadiene rubber in the rubber component is preferably within a range of 10 to 70% by mass.

As the starting material for producing the modified natural rubber may be used a natural rubber latex or at least one solid natural rubber raw material selected from the group consisting of natural rubber, a coagulated mass of a natural rubber latex and a cup lump of natural rubber. For example, when the natural rubber latex is used as the starting material, a polar group-containing modified natural rubber latex is produced and further coagulated and dried to obtain a polar group-containing modified natural rubber. In this context, a production method of the polar group-containing modified natural rubber latex is not particularly limited, and includes, for example, a method comprising adding a polar group-containing monomer to a natural rubber latex to graft-polymerize the polar group-containing monomer onto a natural rubber molecule in the natural rubber latex.

The natural rubber latex used for producing the modified natural rubber is not particularly limited and can include, for example, a field latex, an ammonia-treated latex, a centrifugally concentrated latex, a deproteinized latex treated with a surfactant or an enzyme, and a combination thereof.

The polar group-containing monomer added to the natural rubber latex has at least one polar group in its molecule and is not particularly limited as long as it can be graft-polymerized with the natural rubber molecule. The polar group-containing monomer is preferable to have a carbon-carbon double bond in its molecule for the graft-polymerization with the natural rubber molecule and is preferably a polar group-containing vinyl-based monomer. As a concrete example of the polar group are preferably mentioned amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group, tin-containing group and so on. These polar group-containing monomers may be used alone or in a combination of two or more.

As the amino group-containing monomer are mentioned polymerizable monomers containing in their molecule at least one amino group selected from primary, secondary and tertiary amino groups. Among the polymerizable monomers having the amino group, a tertiary amino group-containing monomer such as dialkylaminoalkyl (metha)acrylate or the like is particularly preferable. These amino group-containing monomers may be used alone or in a combination of two or more. As the primary amino group-containing monomer are mentioned acrylamide, methacrylamide, 4-vinylaniline, aminomethyl (metha)acrylate, aminoethyl (metha)acrylate, aminopropyl (metha)acrylate, aminobutyl (metha)acrylate and so on. As the secondary amino group-containing monomer are mentioned (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene, α-carboxy-β-carboxy-β-phenyl-p-anilinostyrene and the like, (2) anilinophenyl butadienes such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and the like, and (3) N-monosubstituted (metha)acrylamides such as N-methyl (metha)acrylamide, N-ethyl (metha)acrylamide, N-methylol acrylamide, N-(4-anilinophenyl) methacrylamide and the like. As the tertiary amino group-containing monomer are mentioned N,N-disubstituted aminoalkyl (metha)acrylate, N,N-disubstituted aminoalkyl (metha)acrylamide and so on. As the N,N-disubstituted aminoalkyl (metha)acrylate are mentioned esters of acrylic acid or methacrylic acid such as N,N-dimethylaminomethyl (metha)acrylate, N,N-dimethylaminoethyl (metha)acrylate, N,N-dimethylaminopropyl (metha)acrylate, N,N-dimethylaminobutyl (metha)acrylate, N,N-diethylaminoethyl (metha)acrylate, N,N-diethylaminopropyl (metha)acrylate, N,N-diethylaminobutyl (metha)acrylate, N-methyl-N-ethylaminoethyl (metha)acrylate, N,N-dipropylaminoethyl (metha)acrylate, N,N-dibutylaminoethyl (metha)acrylate, N,N-dibutylaminopropyl (metha)acrylate, N,N-dibutylaminobutyl (metha)acrylate, N,N-dihexylaminoethyl (metha)acrylate, N,N-dioctylaminoethyl (metha)acrylate, acryloyl morpholine and so on. Among them, N,N-dimethylaminoethyl (metha)acrylate, N,N-diethylaminoethyl (metha)acrylate, N,N-dipropylaminoethyl (metha)acrylate, N,N-diocytylaminoethyl (metha)acrylate, N-methyl-N-ethylaminoethyl (metha)acrylate and the like are particularly preferable. Also, as the N,N-disubstituted aminoalkyl (metha)acrylamide are mentioned acrylamide compounds and methacrylamide compounds such as N,N-dimethylaminomethyl (metha)acrylamide, N,N-dimethylaminoethyl (metha)acrylamide, N,N-dimethylaminopropyl (metha)acrylamide, N,N-dimethylaminobutyl (metha)acrylamide, N,N-diethylaminoethyl (metha)acrylamide, N,N-diethylaminopropyl (metha)acrylamide, N,N-diethylaminobutyl (metha)acrylamide, N-methyl-N-ethylaminoethyl (metha)acrylamide, N,N-dipropylaminoethyl (metha)acrylamide, N,N-dibutylaminoethyl (metha)acrylamide, N,N-dibutylaminopropyl (metha)acrylamide, N,N-dibutylaminobutyl (metha)acrylamide, N,N-dihexylaminoethyl (metha)acrylamide, N,N-dihexylaminopropyl (metha)acrylamide, N,N-dioctylaminopropyl (metha)acrylamide and so on. Among them, N,N-dimethylaminopropyl (metha)acrylamide, N,N-diethylaminopropyl (metha)acrylamide, N,N-dioctylaminopropyl (metha)acrylamide and the like are particularly preferable.

As the nitrile group-containing monomer are mentioned (metha)acrylonitrile, vinylidene cyanide and so on. These nitrile group-containing monomers may be used alone or in a combination of two or more.

As the hydroxyl group-containing monomer are mentioned polymerizable monomers having in one molecule at least one hydroxyl group selected from primary, secondary and tertiary hydroxyl groups. As such a monomer are mentioned hydroxyl group-containing unsaturated carboxylic acid-based monomers, hydroxyl group-containing vinyl ether-based monomers, hydroxyl group-containing vinyl ketone-based monomers and the like. As the hydroxyl group-containing monomer are concretely mentioned hydroxyalkyl (metha)acrylates such as 2-hydroxyethyl (metha)acrylate, 2-hydroxypropyl (metha)acrylate, 3-hydroxypropyl (metha)acrylate, 2-hydroxybutyl (metha)acrylate, 3-hydroxybutyl (metha)acrylate, 4-hydroxybutyl (metha)acrylate and the like; mono (metha)acrylates of polyalkylene glycol (the number of alkylene glycol units is, for example, 2-23) such as polyethylene glycol, polypropylene glycol and the like; hydroxyl group-containing unsaturated amides such as N-hydroxymethyl (metha)acrylamide, N-(2-hydroxyethyl) (metha)acrylamide, N,N-bis(2-hydroxymethyl) (metha)acrylamide and the like; hydroxyl group-containing vinylaromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like. Among them, the hydroxyl group-containing unsaturated carboxylic acid-based monomers, hydroxyalkyl (metha)acrylates and hydroxyl group-containing vinylaromatic compounds are preferable, and the hydroxyl group-containing unsaturated carboxylic acid-based monomers are particularly preferable. As the hydroxyl group-containing unsaturated carboxylic-based acid monomer are mentioned derivatives such as esters, amides, anhydrides and the like of acrylic acid, methacrylic acid, itaconic acid, fumaric acid, maleic acid and the like. Among them, esters of acrylic acid, methacrylic acid and the like are particularly preferable. These hydroxyl group-containing monomers may be used alone or in a combination of two or more.

As the carboxyl group-containing monomer are mentioned unsaturated carboxylic acids such as (metha)acrylic acid, maleic acid, fumaric acid, itaconic acid, tetraconic acid, cinnamic acid and the like; free carboxyl group-containing esters such as monoesters of a non-polymerizable polyvalent carboxylic acid such as phthalic acid, succinic acid, adipic acid or the like and a hydroxyl group-containing unsaturated compound such as (metha)allyl alcohol, 2-hydroxyethyl (metha) acrylate or the like, and salts thereof. Among them, the unsaturated carboxylic acids are particularly preferable. These carboxyl group-containing monomers may be used alone or in a combination of two or more.

As the epoxy group-containing monomer are mentioned (metha)allyl glycidyl ether, glycidyl (metha)acrylate, 3,4-oxycyclohexyl (metha)acrylate and so on. These epoxy group-containing monomers may be used alone or in a combination of two or more.

As the nitrogen-containing heterocyclic ring in the monomer containing the nitrogen-containing heterocyclic group are mentioned pyrrole, histidine, imidazole, triazolidine, triazole, triazine, pyridine, pyrimidine, pyrazine, indole, quinoline, purine, phenazine, pteridine, melamine and so on. Moreover, the nitrogen-containing heterocyclic ring may include another heteroatom in its ring. A monomer containing pyridyl group as the nitrogen-containing heterocyclic group includes pyridyl group-containing vinyl compounds such as 2-vinylpyridine, 3-vinylpyridine, 4-vinylpyridine, 5-methyl-2-vinylpyridine, 5-ethyl-2-vinylpyridine and so on. Among them, 2-vinylpyridine, 4-vinylpyridine and the like are particularly preferable. These nitrogen-containing heterocyclic group-containing monomers may be used alone or in a combination of two or more.

As the monomer having the tin-containing group are mentioned tin-containing monomers such as allyl tri-n-butyl tin, allyl trimethyl tin, allyl triphenyl tin, allyl tri-n-octyl tin, (metha)acryloxy-n-butyl tin, (metha)acryloxy trimethyl tin, (metha)acryloxy triphenyl tin, (metha)acryloxy-n-octyl tin, vinyl tri-n-butyl tin, vinyl trimethyl tin, vinyl triphenyl tin, vinyl tri-n-octyl tin and so on. These tin-containing monomers may be used alone or in a combination of two or more.

When the polar group-containing monomer is graft-polymerized onto the natural rubber molecule in the natural rubber latex, the graft polymerization of the polar group-containing monomer onto the natural rubber molecule is conducted as an emulsion polymerization. In the emulsion polymerization, it is commonly preferable that a solution formed by adding water and if necessary an emulsifying agent to the natural rubber latex is added with the polar group-containing monomer and further added with a polymerization initiator, and stirred at a given temperature to polymerize the polar group-containing monomer. In the addition of the polar group-containing monomer to the natural rubber latex, the emulsifying agent may be previously added to the natural rubber latex, or the polar group-containing monomer may be emulsified with the emulsifying agent and then added to the natural rubber latex. The emulsifying agent usable in the emulsification of the natural rubber latex and/or the polar group-containing monomer is not particularly limited and includes nonionic surfactants such as polyoxyethylene lauryl ether and the like.

The polymerization initiator is not particularly limited and may include various polymerization initiators for the emulsion polymerization, and also the addition method thereof is not particularly limited. As the commonly used polymerization initiator are mentioned benzoyl peroxide, hydrogen peroxide, cumene hydroperoxide, tert-butyl hydroperoxide, di-tert-butyl peroxide, 2,2-azobisisobutyronitrile, 2,2-azobis(2-diaminopropane) hydrochloride, 2,2-azobis(2-diaminopropane) dihydrochloride, 2,2-azobis(2,4-dimethyl-valeronitrile), potassium persulfate, sodium persulfate, ammonium persulfate and so on. Moreover, it is preferable to use a redox type polymerization initiator for lowering the polymerization temperature. As a reducing agent to be combined with a peroxide in the redox type polymerization initiator are mentioned, for example, tetraethylene pentamine, mercaptanes, acidic sodium sulfite, a reducing metal ion, ascorbic acid and so on. As a preferable combination of the peroxide and the reducing agent in the redox type polymerization initiator are mentioned a combination of tert-butyl hydroperoxide and tetraethylene pentamine and so on. In order to improve the low heat buildup and the wear resistance of the rubber composition by using the modified natural rubber without deteriorating the processability, it is important to evenly introduce a small amount of the polar group-containing monomer into each of the natural rubber molecules. Therefore, the amount of the polymerization initiator added is preferably within a range of 1-100 mol %, and more preferably 10-100 mol % based on the polar group-containing monomer.

The aforementioned components are charged into a reaction vessel and reacted at 30 to 80° C. for 10 minutes to 7 hours to obtain the modified natural rubber latex wherein the polar group-containing monomer is graft-copolymerized onto the natural rubber molecule. Further, the modified natural rubber latex is coagulated and washed, and then dried by using a drying machine such as a vacuum drier, an air drier, a drum drier or the like to obtain the modified natural rubber. The coagulating agent used for coagulating the modified natural rubber latex is not particularly limited, but includes acids such as formic acid, sulfuric acid and the like, and salts such as sodium chloride and the like.

The content of the polar group in the modified natural rubber is preferably within a range of 0.001 to 0.5 mmol/g, more preferably within a range of 0.002 to 0.3 mmol/g, and even more preferably within a range of 0.003 to 0.2 mmol/g based on the rubber component in the modified natural rubber. When the polar group content in the modified natural rubber is less than 0.001 mmol/g, the low heat buildup and the wear resistance of the rubber composition may not be sufficiently improved. While, when the polar group content in the modified natural rubber exceeds 0.5 mmol/g, the physical properties inherent to the natural rubber such as viscoelasticity, S-S characteristic (stress-strain curve in the tensile testing machine) and so on are largely changed to diminish the excellent physical properties inherent to the natural rubber and also the processability of the rubber composition may be largely deteriorated.

On the other hand, the polybutadiene rubber may be modified or unmodified, but the modified polybutadiene rubber is preferably used in the invention from a viewpoint of improving the dispersibility of the carbon black. Moreover, the rubber component of the rubber composition according to the invention is preferable to further comprise a modified styrene-butadiene copolymer rubber obtained through a solution polymerization. The content of the modified styrene-butadiene copolymer rubber in the rubber component is preferably within a range of 10 to 50% by mass. In the modified styrene-butadiene copolymer rubber, a bound styrene content is preferably not higher than 10% by mass. Also, the modified polybutadiene rubber and the modified styrene-butadiene copolymer rubber preferably have a vinyl bond content in a butadiene unit of not higher than 25%, more preferably not higher than 16%, and preferably have a glass transition point of not higher than −50° C. When the bound styrene content and the vinyl bond content in the butadiene unit are within the above ranges, the wear resistance and the low heat buildup of the rubber composition can be improved.

The polybutadiene rubber and the styrene-butadiene copolymer rubber can be produced through various methods such as an emulsion polymerization, a solution polymerization and the like, and the polymerization system may be a batch polymerization system or a continuous polymerization system. The preferable production method are mentioned as follows. That is, 1,3-butadiene alone is or 1,3-butadiene and styrene are polymerized in an inactive solvent, preferably a hydrocarbon solvent in the presence of a polymerization initiator such as an organometal or the like, preferably an organolithium compound or a lithium amide compound to obtain the polybutadiene rubber or the styrene-butadiene copolymer rubber. The hydrocarbon solvent is not particularly limited, but includes, for example, n-pentane, n-hexane, n-heptane, cyclohexane, benzene, toluene and so on. Among them, cyclohexane and n-hexane are preferable. These hydrocarbon solvents may be used alone or in a combination of two or more. The organolithium compound used as the polymerization initiator is preferably a hydrocarbon lithium compound or a lithium amide compound bonded with at least one lithium atom and having a carbon number of 2 to 20. As the hydrocarbon lithium compound are mentioned, for example, n-butyl lithium, sec-butyl lithium, ethyl lithium, n-propyl lithium, tert-octyl lithium, phenyl lithium and so on, and n-butyl lithium is preferable. These organolithium compound initiators may be used alone or in a combination of two or more.

The modified polybutadiene rubber and the modified styrene-butadiene copolymer rubber have at least one functional group, and preferably have at least one functional group selected from the group consisting of a tin-containing functional group, a silicon-containing functional group and a nitrogen-containing functional group in their molecule or at their terminal. It is preferable that such a modified polymer suppresses deterioration of an elastic modulus due to a temperature rise and can also suppress heat generation of the rubber composition compounded with the carbon black in case of introducing a tin atom or a nitrogen atom.

One of the nitrogen-containing functional group is preferably selected from the group consisting of a substituted amino group represented by the following formula (I):

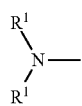

(I)

[wherein $R^1$ is independently an alkyl group having a carbon number of 1 to 12, a cycloalkyl group or an aralkyl group] and a cyclic amino group represented by the following formula (II):

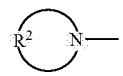

(II)

[wherein $R^2$ is an alkylene group having 3-16 methylene groups, a substituted alkylene group (wherein the substituent is a hydrocarbon group having a carbon number of 1 to 16), an oxyalkylene group or a N-alkylamino-alkylene group, and there may or may not be a crosslinking between carbon atoms in the alkylene groups].

In another example, the nitrogen-containing functional group is preferable to be a functional group obtained by reacting a modification terminator selected from an urea compound such as dimethyl imidazolidinone (DMI), N-methylpyrrolidone (NMP) or the like, a ketone compound substituted with a dialkylamino group such as N,N'-diethyl aminobenzophenone (DEAB) or the like, an aldehyde compound substituted with a dialkylamino group such as diethylaminobenzaldehyde or the like, a compound having a C=N double bond such as a Schiff base compound or the like, an isocyanate group-containing compound, a thioisocyanate group-containing compound, a hydrocarbyloxy silane compound having a nitrogen-containing substituent and so on with a polymer having a polymerization active terminal (living polymer). Moreover, it can be introduced by reacting with a polymerizable vinyl compound or conjugated diene compound having a nitrogen-containing functional group such as 2-vinylpyridine, 4-(N,N-dimethylamino)methylstyrene or the like.

Also, the modified polybutadiene rubber and the modified styrene-butadiene copolymer rubber are particularly preferable to have a branched structure. The branched structure can be introduced by using an initiator having a functionality of not less than three, a modifying agent having a functionality of not less than three, a monomer having a polymerization active group of not less than two or the like. It is preferable to use the modified agent having a functionality of not less than three. The modified rubber is produced through a known method, and is typically obtained by starting polymerization with an organolithium initiator and then adding various modifying agents to a solution of a polymer having a lithium active terminal (see JP-B-H6-89183, JP-A-H11-29659 and the like). It is preferable that the modifying agent is charged after the completion of the polymerization. As a coupling agent are mentioned halides such as tin halide, silicon halide and the like. A halogen in the coupling agent is generally fluorine, chlorine, bromine or iodine. Among them, chlorine is preferable. Also, tin or silicon atom of Group VIa is preferable, and tin is particularly preferable. For example, the tin-containing functional group can be introduced with a tin compound such as tin tetrachloride, tributyltin, dioctyltin dichloride, dibutyltin dichloride, triphenyltin chloride or the like. When the tin-based modifying agent having a functionality of not less than two is used, the polymers having the lithium active terminal are coupled with the modifying agent and the tin atom is incorporated into their molecule. Also, when the monofunctional modifying agent such as triphenyltin chloride or the like is used, the tin atom is incorporated to the terminal of the polymer.

The nitrogen-containing functional group can be introduced with a nitrogen-containing compound including an isocyanate-based compound such as 2,4-tolylene diisocyanate, diisocyanate diphenylmethane, diphenylmethane diisocyanate [MDI (including a commercially available one commonly known as crude MDI which is a mixture of analogs having the different number of nuclei)] or the like, a thioisocyanate compound, an aminobenzophenone compound such as 4,4'-bis(diethylamino)-benzophenone, 4-(dimethylamino) benzophenone or the like, an urea derivative such as 1,3-dimethyl-2-imidazolidinone, 1,3-diethyl-2-imidazolidinone, 1,3-dimethyl-3,4,5,6-tetrahydropyrimidine or the like, a ketimine or aldimine compound having a C=N—C bond such as 4-dimethylaminobenzylidene aniline or the like, a cyclic amide compound such as N-methylpyrrolidone or the like. Also, it can be introduced by a reaction with a polymerizable vinyl compound or conjugated diene compound having a nitrogen-containing group such as 2-vinylpyridine, 4-(N,N-dimethylamino)methylstyrene or the like.

Further, when a lithium amide compound is used as a polymerization initiator, a (co)polymer having a nitrogen-containing functional group at a polymerization starting terminal and a polymerization active site at another terminal can be obtained, so that the rubber component having one functional group can be produced without modifying the (co)polymer through a reaction with a modification terminator or the like. As the lithium amide compound are mentioned lithium hexamethylene imide, lithium pyrrolidide, lithium piperidide, lithium heptamethylene imide, lithium dodecamethylene imide, lithium dimethyl amide, lithium diethyl amide, lithium dipropyl amide, lithium dibutyl amide, lithium dihexyl amide, lithium diheptyl amide, lithium dioctyl amide, lithium di-2-ethylhexyl amide, lithium didecyl amide, lithium-N-methyl piperazide, lithium ethyl propyl amide, lithium ethyl butyl amide, lithium methyl butyl amide, lithium ethyl benzyl amide, lithium methyl phenethyl amide, N-lithio morpholine, N-methyl-N'-lithio homopiperazine, N-ethyl-N'-lithio homopiperazine, N-butyl-N'-lithio homopiperazine and so on. Among them, cyclic lithium amide compounds such as lithium hexamethylene imide, lithium pyrrolidide, lithium piperidide, lithium heptamethylene imide, lithium dodecamethylene imide and the like are preferable, and lithium hexamethylene imide and lithium pyrrolidide are particularly preferable. In a preferable embodiment, the lithium amide compound is previously produced in the presence of a solubilizing component (SOL) as disclosed in JP-A-H06-206920 or in the absence of the solubilizing component as disclosed in JP-A-H06-199922, and may be then used as a polymerization initiator. Moreover, the lithium amide compound can be produced in a polymerization system (in situ) without a preliminary preparation to use as a polymerization initiator as disclosed in JP-A-H06-199921.

The silicon-containing functional group can be introduced through any known methods capable of introducing an alkoxysilyl group or a silanol group, but preferably through a method capable of introducing it by using a specified hydrocarbyloxy silane compound (which contains an alkoxysilyl group and/or an allyloxysilyl group having a carbon number of 1 to 20, and optionally contains a hydrocarbylene group having a carbon number of 1 to 20 and further bonded to a functional group such as epoxy group, amino group, ketimine group, amide group, carboxylic acid ester group, carbonic acid ester group, isocyanate group, thioisocyanate group, nitrile group or the like in the same molecule) as a modification terminator to react it with a polymerization active terminal. The hydrocarbyloxy silane compound includes a compound formed by partially condensing the hydrocarbyloxy groups. The hydrocarbyloxy silane compound concretely includes, for example, a compound formed by bonding 2 to 4 hydrocarbyloxy groups having a carbon number of 1 to 20 to a silicon atom such as tetraethoxy silane, methyltriphenoxy silane or the like as an example of not containing another functional group except for a hydrocarbon group.

As an epoxy group-containing alkoxysilane compound are concretely mentioned 2-glycidoxyethyl trimethoxysilane, 2-glycidoxyethyl triethoxysilane, (2-glycidoxyethyl) methyl dimethoxysilane, (2-glycidoxyethyl) methyl diethoxysilane, 3-glycidoxypropyl trimethoxysilane, 3-glycidoxypropyl triethoxysilane, (3-glycidoxypropyl) methyl dimethoxysilane, (2-glycidoxypropyl) methyl diethoxysilane, 2-(3,4-epoxycyclohexyl)ethyl trimethoxysilane, 2-(3,4-epoxycyclohexyl) ethyl triethoxysilane, 2-(3,4-epoxycyclohexyl)ethyl (methyl) diethoxysilane, 2-(3,4-epoxycyclohexyl)ethyl (methyl) dimethoxysilane and the like.

As an amino group-containing alkoxysilane compound are mentioned a disubstituted amino group-containing hydrocarbyloxy silane compound such as 3-(N,N-dimethylamino)propyl (triethoxy) silane, 3-(N,N-dimethylamino)propyl (trimethoxy) silane, 3-(N,N-diethylamino)propyl (triethoxy) silane, 3-(N,N-diethylamino)propyl (trimethoxy) silane, 2-(N,N-dimethylamino)ethyl (triethoxy) silane, 2-(N,N-dimethylamino)ethyl (trimethoxy) silane, 3-(N,N-dimethylamino)propyl (diethoxy) methylsilane, 3-(N,N-dibutylamino)propyl (triethoxy) silane or the like, and a cyclic amino group-containing hydrocarbyloxy silane compound such as 3-(1-hexamethyleneimino)propyl (triethoxy) silane, 3-(1-hexamethyleneimino)propyl (trimethoxy) silane, 3-(1-hexamethyleneimino)propyl (diethoxy) methylsilane, (1-hexamethyleneimino)methyl (trimethoxy) silane, (1-hexamethyleneimino)methyl (triethoxy) silane, 2-(1-hexamethyleneimino)ethyl (triethoxy) silane, 2-(1-hexamethyleneimino)ethyl (trimethoxy) silane, 3-(1-pyrrolidinyl)propyl (triethoxy) silane, 3-(1-pyrrolidinyl)propyl (trimethoxy) silane, 3-(1-heptamethyleneimino)propyl (triethoxy) silane, 3-(1-dodecamethyleneimino)propyl (triethoxy) silane, 3-(1-hexamethyleneimino)propyl (diethoxy) methylsilane, 3-(1-hexamethyleneimino)propyl (diethoxy) ethylsilane, 1-[3-(triethoxysilyl)propyl]-4,5-dihydroimidazole, 1-[3-(diethoxymethylsilyl)propyl]-4,5-dihydroimidazole, 1-[3-(trimethoxysilyl)propyl]-4,5-dihydroimidazole, 3-[10-(triethoxysilyl)decyl]-4-oxazoline or the like.

As an imino group-containing alkoxysilane compound are mentioned N-(1,3-dimethylbutylidene)-3-(triethoxysilyl)-1-propaneamine, N-(1,3-dimethylbutylidene)-3-(trimethoxysilyl)-1-propaneamine, N-(1,3-dimethylbutylidene)-3-(diethoxy(methyl)silyl)-1-propaneamine, N-(1,3-dimethylbutylidene)-3-(dimethoxy(methyl)silyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine and the like.

As the isocyanate group-containing compound are mentioned 3-isocyanatopropyl trimethoxysilane, 3-isocyanatopropyl triethoxysilane, 3-isocyanatopropyl methyldiethoxysilane, 3-isocyanatopropyl triisopropoxysilane and the like.

For example, the modified rubber can be also obtained by polymerizing with a lithium amide initiator obtained from an acyclic secondary amine compound such as diethylamine or the like or a cyclic secondary amine compound such as hexamethylene imine or the like and an organolithium compound, or further adding the above-described modifying agent in a solution of a polymer having a lithium active terminal obtained by the polymerization. It is also preferable that the modified rubber having the functional group introduced in its molecular chain can suppress the decrease of the elastic modulus due to the temperature rise but also improve the dispersion state of the carbon black in the rubber composition to effectively improve the low heat buildup. Particularly, ones having the branched structure obtained by using a multifunctional modifying agent are preferable. Furthermore, the modified polymer, wherein a tin atom or an organofunctional group such as epoxy group, amino group, ketimine group, amide group, isocyanate group, thioisocyanate group, nitrile group or the like is introduced with the alkoxysilyl group, is particularly effectively applied to the rubber composition comprising the carbon black according to the invention.

When the (co)polymer having the polymerization active site is produced through the anionic polymerization, as the polymerization initiator is preferably used an organic alkali metal compound or an alkali metal amide compound, and a lithium compound is more preferably used. As the lithium compound are mentioned a hydrocarbyl lithium, a lithium amide compound and so on. When the hydrocarbyl lithium is used as the polymerization initiator, a (co)polymer having a hydrocarbyl group at a polymerization starting terminal and a polymerization active site at another terminal can be obtained. On the other hand, when the lithium amide compound is used as the polymerization initiator, a (co)polymer having a nitrogen-containing functional group at a polymerization starting terminal and a polymerization active site at another terminal can be obtained, and the (co)polymer can be used as the modified polymer even without being modified with the modifying agent. Moreover, the amount of the organic alkali metal compound or the alkali metal amide compound used as the polymerization initiator is preferably within a range of 0.2 to 100 mmol per 100 g of the monomer.

As the hydrocarbyl lithium are mentioned ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium and so on. Among them, alkyl lithiums such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

On the other hand, as the lithium amide compound are mentioned lithium hexamethylene imide, lithium pyrrolidide, lithium piperidide, lithium heptamethylene imide, lithium dodecamethylene imide, lithium dimethyl amide, lithium diethyl amide, lithium dipropyl amide, lithium dibutyl amide, lithium dihexyl amide, lithium diheptyl amide, lithium dioctyl amide, lithium di-2-ethylhexyl amide, lithium didecyl amide, lithium-N-methyl piperazide, lithium ethyl propyl amide, lithium ethyl butyl amide, lithium methyl butyl amide, lithium ethyl benzyl amide, lithium methyl phenethyl amide, N-lithio morpholine, N-methyl homopiperazine, N-ethyl homopiperazine, N-butyl homopiperazine and so on. Among them, cyclic lithium amide compounds such as lithium hexamethylene imide, lithium pyrrolidide, lithium piperidide, lithium heptamethylene imide, lithium dodecamethylene imide and the like are preferable, and lithium hexamethylene imide and lithium pyrrolidide are particularly preferable.

The modified polybutadiene rubber and the modified styrene-butadiene copolymer rubber introduced with at least one nitrogen-containing functional group selected from the group consisting of the substituted amino group represented by the formula (I) and the cyclic amino group represented by the formula (II) can be obtained by using a lithium amide compound represented by the formula: Li-AM [wherein AM is the substituted amino group represented by the formula (I) or the cyclic amino group represented by the formula (II)] as the lithium amide compound.

In the formula (I), $R^1$ is an alkyl group having a carbon number of 1-12, a cycloalkyl group or an aralkyl group and concretely includes methyl group, ethyl group, butyl group, octyl group, cyclohexyl group, 3-phenyl-1-propyl group, isobutyl group and so on. Moreover, $R^1$s may be same or different.

In the formula (II), $R^2$ is an alkylene group having 3-16 methylene groups, a substituted alkylene group, an oxyalkylene group or a N-alkylamino-alkylene group. There may or may not be a crosslinking between carbon atoms. At this moment, the substituted alkylene group includes monosubstituted to octasubstituted alkylene groups and as a substituent are mentioned a linear or branched alkyl group having a carbon number of 1-12, a cycloalkyl group, a bicycloalkyl group, an aryl group and an aralkyl group. As $R^2$ are concretely preferable trimethylene group, tetramethylene group, hexamethylene group, oxydiethylene group, N-alkylazadiethylene groups such as N-methylazadiethylene group, N-butylazadiethylene group and so on, dodecamethylene group, hexadecamethylene group and the like.

The lithium amide compound may be previously prepared from a secondary amine and the lithium compound and used for the polymerization reaction, or may be produced in the polymerization system. As the secondary amine are mentioned dimethyl amine, diethyl amine, dibutyl amine, dioctyl amine, dicyclohexyl amine, diisobutyl amine and the like, as well as cyclic amines such as pyrrolidine, piperidine, azacycloheptane (i.e., hexamethylene imine), N-methyl homopiperazine, N-butyl homopiperazine, morpholine, dodecamethylene imine, 2-(2-ethylhexyl) pyrrolidine, 3-(2-propyl) pyrrolidine, 3,5-bis(2-ethylhexyl) piperidine, 4-phenyl piperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4'-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, 1,5,5-trimethyl-3-azabicyclo[4.4.0]decane and the like. On the other hand, as the lithium compound may be used the above-described hydrocarbyl lithium.

The carbon black used in the rubber composition according to the invention preferably has a dibutyl phthalate (DBP) absorption number of 140 to 200 mL/100 g, more preferably 140 to 180 mL/100 g. When the DBP absorption number is lower than 140 mL/100 g, the wear resistance cannot be sufficiently ensured, while when it exceeds 200 mL/100 g, the workability and elongation characteristic are deteriorated and thereby general properties as a rubber may be deteriorated, and further the low heat buildup cannot be sufficiently ensured. In this context, the DBP absorption number can be measured according to JIS K6221 (1982) 6.1.2.A method.

In the carbon black used in the rubber composition according to the invention, a ratio (Dw/Dn) of a weight average diameter (Dw) to a number average diameter (Dn) of an aggregate is preferably 1.80 to 2.40, more preferably 1.80 to 2.30. When the Dw/Dn is lower than 1.80, the low heat buildup may not be sufficiently ensured, while when it exceeds 2.40, the wear resistance may be deteriorated. In this context, the "aggregate" means a secondary particle of the carbon black distributed in the rubber composition. The weight average diameter (Dw) and the number average diameter (Dn) can be measured by using a known measuring machine, for example, Disc Centrifuge Photosedimentometer (DCP) [BI-DCP manufactured by DCP Brook Haven Corporation].

In the carbon black used in the rubber composition according to the invention, a tint strength (Tint, %) and a nitrogen adsorption specific surface area ($N_2SA$, $m^2/g$) preferably satisfy the above-described relation of the formula (2) as an absolute value. When the tint strength (Tint) and the nitrogen adsorption specific surface area ($N_2SA$) do not satisfy the formula (2), a reinforcing property is deteriorated, while when they satisfy the formula (2), there is an advantage in view of the wear resistance. In this context, the tint strength (Tint) can be measured according to JIS K6221-1982 A method and the nitrogen adsorption specific surface area ($N_2SA$) can be measured according to a definition in ASTM D3037-88.

Into the rubber composition of the invention can be properly compounded additives usually used in the rubber industry such as a softening agent, an antioxidant, a vulcanizing agent, a vulcanization accelerator, an anti-scorching agent, zinc white, stearic acid and the like in addition to the above rubber component and the carbon black in accordance with the use purpose. As these additives can be preferably used commercially available ones. The rubber composition of the invention can be produced by compounding the rubber component with the carbon black, and, if necessary, the properly selected additives and milling, warming, extruding and so on.

The heavy duty pneumatic tire according to the invention is characterized by using the above-mentioned rubber composition in a tread. In the heavy duty pneumatic tire according to the invention, the rubber composition comprising the carbon black in the amount of 40 to 60 parts by mass based on 100 parts by mass of the rubber component and satisfying the relation of the formula (1) is used in the tread, so that the wear resistance and the low heat buildup are excellent. Moreover, the heavy duty pneumatic tire according to the invention is not particularly limited, but preferably comprises a circumferential-direction belt containing a reinforcing cord arranged substantially in parallel to an equatorial plane of the tire. As the reinforcing cord in the circumferential-direction belt are mentioned an organic fiber cord, a steel cord and so on, and as a coating rubber for the reinforcing cord can be used a common rubber composition used for a coating rubber. Moreover, as a gas filled into the heavy duty pneumatic tire according to the invention can be used usual air or air having a regulated partial oxygen pressure, or inert gases such as nitrogen and so on.

EXAMPLES

The following examples are given in illustration of the invention and are not intended as limitations thereof.

<Production Example of Partially Deproteinized Natural Rubber>

A natural rubber latex (CT-1) added with 0.4% by mass of ammonia is concentrated by centrifugal separation at a revolution number of 7500 rpm for 15 minutes through a latex separator SLP-3000 (made by Saito Separator Limited). The concentrated latex is further subjected to a centrifugal separation at a revolution number of 7500 rpm for 15 minutes. The resulting concentrated latex is diluted so as to be about 20% of a solid content, and added with formic acid and left to stand over a night. The resulting coagulated rubber component is dried at 110° C. for 210 minutes to prepare a partially deproteinized natural rubber. A measurement according to a Kjeldahl method reveals that the total nitrogen content of the resulting natural rubber is 0.15% by mass.

<Production Method of Modified Natural Rubber (DEMA)>

A field latex is subjected to a centrifugal separation with a latex separator [made by Saito Separator Limited] at a revolution speed of 7500 rpm to obtain a concentrated latex having a dry rubber concentration of 60%. 1000 g of the concentrated latex is charged into a stainless reaction vessel provided with a stirrer and a temperature-regulating jacket, and an emulsion previously formed by adding 10 mL of water and 90 mg of an emulsifying agent [Emulgen 1108, made by Kao Corporation] to 3.0 g of N,N-diethylaminoethyl methacrylate (DEMA) is added together with 990 mL of water, and then stirred for 30 minutes at normal temperature while substituting with nitrogen. Then, 1.2 g of tert-butyl hydroperoxide and 1.2 g of tetraethylene pentamine are added as a polymerization initiator to conduct reaction at 40° C. for 30 minutes, whereby a modified natural rubber latex is obtained. The modified natural rubber latex is coagulated by adding formic acid to adjust pH to 4.7. The thus obtained solid is treated with a clapper 5 times, crumbed through a shredder and dried by a hot air drier at 110° C. for 210 minutes to obtain a modified natural rubber (DEMA). It is confirmed from a mass of the thus obtained modified natural rubber (DEMA) that the conversion of N,N-diethylaminoethyl methacrylate added as a monomer is 100%. Also, the separation of a homopolymer is tried by extracting the modified natural rubber A with a petroleum ether and further extracting with a 2:1 mixed solvent of acetone and methanol, but the homopolymer is not detected from the analysis of the extract, so that it is confirmed that 100% of the monomer added is introduced into the natural rubber molecule. Therefore, the polar group content in the resulting modified natural rubber (DEMA) is 0.027 mmol/g based on the rubber component in the natural rubber latex.

<Production Method of Modified Natural Rubber (VP)>

A modified natural rubber (VP) is obtained in the same manner as in the production method of the modified natural rubber (DEMA) except that 1.7 g of 4-vinylpyridine (VP) is added as a monomer instead of 3.0 g of N,N-diethylaminoethyl methacrylate (DEMA). Also, the modified natural rubber (VP) is analyzed in the same manner as in the modified natural rubber (DEMA), and as a result, it is confirmed that 100% of the monomer added is introduced into the natural rubber molecule. Therefore, the polar group content in the modified natural rubber (VP) is 0.027 mmol/g based on the rubber component in the natural rubber latex.

<Production Method of Modified Polybutadiene Rubber>

Into a pressure glass vessel of about 900 mL in capacity dried and purged with nitrogen are charged 283 g of cyclohexane, 50 g of 1,3-butadiene, and a cyclohexane solution of each of 0.0057 mmol of 2,2-ditetrahydrofuryl propane and 0.513 mmol of hexamethylene imine, and 0.57 mmol of n-butyllithium (BuLi) is added, which is placed in a warm bath of 50° C. provided with a stirrer to conduct polymerization for 4.5 hours. The degree of conversion is approximately 100%. To this polymerization system is added a solution of 0.100 mmol of tin tetrachloride in cyclohexane, which is stirred at 50° C. for 30 minutes. Thereafter, 0.5 mL of a 5% solution of 2,6-di-t-butyl paracresol (BHT) in isopropanol is added to stop the reaction, and further the drying is carried out by the usual manner to obtain a modified polybutadiene rubber (modified BR). As the vinyl bond (1,2-bond) content of the resulting modified BR is measured from integral ratios of $^1$H-NMR spectra [Alpha 400 MHz NMR device, made by JEOL Ltd. in $CDCl_3$], the vinyl bond content in the butadiene unit is 14%. Further, as the coupling efficiency of the resulting modified BR is calculated by using an area ratio of peaks at a high molecular weight side among data obtained through a gel permeation chromatography (GPC), the coupling efficiency is 65%. Furthermore, the glass transition point is −95° C.

<Production Example of Modified Styrene-Butadiene Copolymer Rubber>

Into a pressure glass vessel of 800 mL dried and purged with nitrogen are charged 300 g of cyclohexane, 37.5 g of 1,3-butadiene monomer, 12.5 g of styrene monomer, 0.03 mmol of potassium-t-amylate and 2 mmol of THF, and further 0.41 mmol of hexamethylene imine is added as a secondary amine. To this mixture is added 0.45 mmol of n-butyl lithium (n-BuLi), and then polymerization reaction is conducted at 50° C. for 2.5 hours. The polymerization system is homogeneous and clear from beginning to end of the polymerization, in which there is no precipitation. The polymerization conversion is approximately 100%. A portion of the polymerization solution is sampled and added with isopropyl alcohol, the resulting solid is dried to obtain a rubbery copolymer. With respect to this copolymer, micro-structure, molecular weight, and molecular weight distribution are measured. Further, 0.09 mmol of a 1 M solution of tin tetrachloride in cyclohexane is added to the polymerization system to further conduct modification reaction for 30 minutes. Thereafter, 0.5 mL of a 5% solution of 2,6-di-tertiary-butyl-para-cresol (BHT) in isopropyl alcohol is added to the polymerization system to stop the reaction and then dried according to a usual manner to obtain a modified styrene-polybutadiene copolymer rubber (modified SBR). The resulting SBR has a bound styrene content of 25% by mass and a vinyl bond content of 28%.

<Production Example of Carbon Black>

Carbon black (a) is prepared by using the producing furnace shown in FIGS. 1 and 2 of JP-A-2005-307172 as a carbon black producing furnace, a fuel oil A having a specific gravity of 0.8622 (15° C./4° C.) as a fuel, and a heavy oil having properties shown in Table 1 as a starting oil under the manufacturing conditions shown in Table 2. The properties of the resulting carbon black (a) are shown in Table 3.

TABLE 1

| Specific gravity (JIS K2249) (15/4° C.) | | 1.1319 |
|---|---|---|
| Kinematic viscosity (JIS K2283) (mm²/s at 50° C.) | | 26.7 |
| Water content (JIS K2275) (%) | | 0.5 |
| Residual carbon (JIS K2210) (%) | | 11.6 |
| Sulfur content (JIS K2213) (%) | | 0.4 |
| Carbon content (%) | | 90.1 |
| Hydrogen content (%) | | 5.4 |
| BMCI (U.S. Bureau of Mines Correlation Index) | | 160 |
| Distillation characteristics (° C.) | I.B.P (Initial boiling point) | 188 |
| | 10% cut point | 234 |
| | 30% cut point | 291 |
| | 50% cut point | 360 |

TABLE 2

| Conditions for introducing the starting oil | Introduction amount (kg/hr) | 295 |
|---|---|---|
| | Pre-heating temperature (° C.) | 195 |
| Conditions for introducing air | Total air amount introduced (kg/hr) | 1390 |
| | Pre-heating temperature (° C.) | 605 |
| | Amount of fuel introduced (kg/hr) | 68 |
| Residence time t1 (sec) | | 0.0045 |
| Residence time t2 (sec) | | 0.058 |
| Average reaction temperature T1 (° C.) | | 1535 |
| Average reaction temperature T2 (° C.) | | 1375 |
| Reaction ratio α (sec · ° C.) | | 6.91 |
| Reaction ratio β (sec · ° C.) | | 79.8 |

In Table 2, t1 is a residence time (sec) from the introduction of the starting oil into the high-temperature combustion gas flow to the introduction of the quenching medium, T1 is an average reaction temperature (° C.) in this space, t2 is a residence time (sec) from the introduction of the quenching medium to the enter of the reaction gas flow into the reaction stop zone, T2 is an average reaction temperature (° C.) in this space, α is t1×T1 and β is t2×T2.

TABLE 3

| DBP (mL/100 g) | 151.7 |
|---|---|
| 24M4DBP (mL/100 g) | 113 |
| ΔDBP (mL/100 g) | 38.7 |
| Hydrogen emitting ratio (mass %) | 0.245 |
| ΔD50 | 51 |
| ΔD50/Dst | 0.76 |
| Dw/Dn | 1.50 |
| TINT (%) | 127.8 |
| 0.1 × $N_2SA$ + 93 | 106.47 |

In Table 3, the 24M4 DBP is measured according to a method described in ASTM D2414-88 (JIS K6217-97), the hydrogen emitting ration is a value represented as a mass percentage by measuring an amount of hydrogen gas produced when (i) a carbon black sample is dried in an isothermic drier of 105° C. for 1 hour and cooled to room temperature in a desiccator, (ii) about 10 mg of the sample is weighed in a tubular vessel made of tin and pressed and sealed and (iii) the sample is heated at 2000° C. in a stream of an argon for 15 minutes in a hydrogen analyzing device (EMGA621W, manufactured by Horiba Seisakusho), the Dst is an aggregate property of the carbon black measured by a centrifugal sedimentation analysis and means a modal diameter in a distribution curve of Stokes equivalent diameters, i.e., the most frequent value, and ΔD50 means a half-width of the distribution curve with respect to the most frequent value (Dst) and measured by using Disc Centrifuge Photosedimentometer (DCP) [BI-DCP, manufactured by DCP Brook Haven Corporation].

<Preparation and Evaluation of Rubber Composition>

A rubber composition having a compounding recipe as shown in Table 4 or 5 is prepared and with respect to the rubber composition, the loss tangent (tan δ), ΔE' and glass transition point (Tg) are measured according to the following methods. Results are shown in Tables 4 and 5.

(1) Loss Tangent (Tan δ) and ΔE'

With respect to a vulcanized rubber obtained by vulcanizing the rubber composition, tan δ is measured at a frequency of 52 Hz, an initial load of 160 g, a temperature of 25° C. (room temperature) and a strain of 1% by using a spectrometer manufactured by Toyo Seiki Corporation. Further, storage moduli (E') are measured at a frequency of 52 Hz, an initial load of 160 g, a temperature of 25° C. (room temperature) and a strain of 0.1% or 2%, and a difference therebetween (ΔE') is calculated.

(2) Glass Transition Point (Tg)

A temperature-tan δ curve is measured under the same conditions as in the measurement of the tan δ, and a temperature corresponding to a peak of tan δ is defined as a glass transition point.

<Preparation and Evaluation of Tire>

A heavy duty pneumatic tire comprising a circumferential-direction belt on an outside of a crown portion of a carcass in a radial direction of the tire and having a tire size of 495/45 R22.5 is prepared by using the rubber composition in a tread. With respect to the resulting tire, wear resistance and low heat buildup are evaluated according to the following methods. Results are shown in Tables 4 and 5.

(3) Wear Resistance (Europe)

A residual depth of a groove is measured after the running over 50000 km, Running distance/(Groove depth before the running−Groove depth after the running) is calculated and is shown by an index on the basis that the value in Comparative Example 1 is 100. The larger the index value, the less the worn amount and the better the wear resistance.

(4) Low Heat Buildup (Rolling Resistance)

With respect to the test tire, a drum test is conducted to determine a rolling resistance at 80 km/h of running on a drum and is shown by an index on the basis that the value in Comparative Example 1 is 100. The smaller the index value, the smaller the rolling resistance and the more excellent the low heat buildup.

(5) Wear Resistance (Japan)

A heavy duty pneumatic tire having the same structure as the above-described test tire has and having a tire size of 11R22.5 is prepared, and with respect to the tire, wear resistance (Japan) is evaluated in the same manner as in the above description. Results are shown in Tables 4 and 5.

TABLE 4

| | | | Example 1 | Example 2 | Example 3 | Example 4 | Comparative Example 1 | Comparative Example 2 | Comparative Example 3 |
|---|---|---|---|---|---|---|---|---|---|
| Formulation | Partially deproteinized NR *1 | parts by mass | 70 | 50 | 70 | 70 | 70 | 70 | 70 |
| | Modified NR (VP) *2 | | — | — | — | — | — | — | — |
| | Modified NR (DEMA) *3 | | — | — | — | — | — | — | — |
| | Modified BR *4 | | 30 | 30 | 30 | 30 | — | 30 | 30 |
| | BR *5 | | — | — | — | — | 30 | — | — |
| | Modified SBR *6 | | — | 20 | — | — | — | — | — |
| | Carbon black (a) *7 | | 50 | 50 | 45 | 55 | 50 | 38 | 62 |
| | Carbon black (ISAF) *8 | | — | — | — | — | — | — | — |
| | Vulcanization accelerator *9 | | 1.5 | 1.5 | 1.5 | 1.5 | 1.5 | 1.5 | 1.5 |
| | Sulfur | | 1.1 | 1.1 | 1.1 | 1.1 | 1.1 | 1.1 | 1.1 |
| Properties | Tg | °C. | −46 | −46 | −46 | −46 | −49 | −46 | −46 |
| | tan δ | | 0.161 | 0.166 | 0.151 | 0.175 | 0.195 | 0.127 | 0.212 |
| | 0.29 × A − 11 | | 3.5 | 3.5 | 2.1 | 5.0 | 3.5 | 0.02 | 7.0 |
| | ΔE' (0.1%-2%) | MPa | 3.2 | 3.3 | 1.9 | 4.6 | 5.2 | 0.9 | 7.2 |
| Performance | Wear resistance (Japan) | index | 120 | 119 | 104 | 123 | 100 | 88 | 118 |
| | Wear resistance (Europe) | index | 127 | 120 | 108 | 130 | 100 | 87 | 125 |
| | Low heat buildup | index | 94 | 94 | 92 | 98 | 100 | 85 | 104 |

TABLE 5

| | | | Example 5 | Example 6 | Example 7 | Comparative Example 4 | Comparative Example 5 | Comparative Example 6 | Comparative Example 7 |
|---|---|---|---|---|---|---|---|---|---|
| Formulation | Partially deproteinized NR *1 | parts by mass | — | — | 70 | 70 | 70 | 70 | 70 |
| | Modified NR (VP) *2 | | 70 | — | — | — | — | — | — |
| | Modified NR (DEMA) *3 | | — | 70 | — | — | — | — | — |
| | Modified BR *4 | | — | — | 30 | — | — | — | — |
| | BR *5 | | 30 | 30 | — | 30 | 30 | 30 | 30 |
| | Modified SBR *6 | | — | — | — | — | — | — | — |
| | Carbon black (a) *7 | | 53 | 53 | — | 45 | 52 | — | — |
| | Carbon black (ISAF) *8 | | — | — | 50 | — | — | 45 | 52 |
| | Vulcanization accelerator *9 | | 1.5 | 1.5 | 1.5 | 1.5 | 1.5 | 1.5 | 1.5 |
| | Sulfur | | 1.1 | 1.1 | 1.1 | 1.1 | 1.1 | 1.1 | 1.1 |
| Properties | Tg | °C. | −45 | −45 | −46 | −49 | −49 | −49 | −49 |
| | tan δ | | 0.177 | 0.180 | 0.140 | 0.169 | 0.209 | 0.141 | 0.171 |
| | 0.29 × A − 11 | | 4.4 | 4.4 | 3.5 | 2.1 | 4.1 | 2.1 | 4.1 |
| | ΔE' (0.1%-2%) | MPa | 4.2 | 4.2 | 1.5 | 3.4 | 6.5 | 2.3 | 4.6 |
| Performance | Wear resistance (Japan) | index | 108 | 108 | 115 | 91 | 104 | 82 | 95 |
| | Wear resistance (Europe) | index | 110 | 111 | 118 | 89 | 106 | 79 | 93 |
| | Low heat buildup | index | 97 | 98 | 89 | 96 | 104 | 91 | 97 |

*1 Partially deproteinized natural rubber produced through the above-described method
*2 Modified natural rubber (VP) produced through the above-described method
*3 Modified natural rubber (DEMA) produced through the above-described method
*4 Modified polybutadiene rubber produced through the above-described method
*5 UBEPOL-BR150L manufacture by Ube Industries, Ltd.
*6 Modified styrene-butadiene copolymer rubber produced through the above-described method
*7 Carbon black (a) produced through the above-described method
*8 ISAF grade of carbon black, DBP absorption number = 161 mL/100 g, Tint = 115, $N_2SA$ = 110 $m^2$/g, Dw/Dn = 1.68
*9 NOCCELER CZ manufactured by Ouchi Shinko Chemical Industrial Co., Ltd., N-cyclohexyl-2-benzothiazolyl sulfenamide As seen from Tables 4 and 5, both of the wear resistance and the low heat buildup of the heavy duty tire can be improved by using in the tread the rubber composition comprising 40 to 60 parts by mass of the carbon black based on 100 parts by mass of the rubber component and satisfying the above-described relation of the formula (1).

Also, as seen from the Comparative Example 2, when the amount of the carbon black compounded is less than 40 parts by mass, the wear resistance is deteriorated. Further, as seen from the Comparative Example 3, when the amount of the carbon black compounded exceeds 60 parts by mass, the low heat buildup is deteriorated. Furthermore, as seen from the results of the Comparative Examples, the wear resistance and the low heat buildup of the tire cannot be simultaneously established by using the rubber composition not satisfying the relation of the formula (1) in the tread.

The invention claimed is:

1. A rubber composition characterized by comprising 40 to 60 parts by mass of a carbon black based on 100 parts by mass of a rubber component composed of natural rubber and a diene-based synthetic rubber and satisfying a relation of the following formula (1):

$$\Delta E' < 0.29 \times A - 11 \quad (1)$$

[wherein $\Delta E'$ is a difference between a storage modulus (MPa) at a strain of 0.1% and a storage modulus (MPa) at a strain of 2% measured at 25° C., and A is an amount (parts by mass) of the carbon black compounded based on 100 parts by mass of the rubber component].

2. A rubber composition according to claim 1, which has a loss tangent (tan δ) at 25° C. of not higher than 0.166.

3. A rubber composition according to claim 1, which has a glass transition point (Tg) of not lower than −50° C.

4. A rubber composition according to claim 1, wherein the rubber component comprises a natural rubber obtained from a latex formed by partially removing protein from a natural rubber latex through a mechanical separation means and having a total nitrogen content of more than 0.1% by mass but not more than 0.4% by mass and polybutadiene rubber, and the carbon black comprises a carbon black in which a dibutyl phthalate (DBP) absorption number is 140 to 200 mL/100 g and a tint strength (Tint) and a nitrogen adsorption specific surface area ($N_2SA$) satisfy a relation of the following formula (2):

$$Tint \geq 0.100 \times N_2SA + 93 \quad (2).$$

5. A rubber composition according to claim 4, wherein the carbon black comprises a carbon black in which a ratio (Dw/Dn) of a weight average diameter (Dw) to a number average diameter (Dn) of an aggregate is 1.80 to 2.40.

6. A rubber composition according to claim 4, wherein the polybutadiene rubber is a modified polybutadiene rubber.

7. A rubber composition according to claim 4, wherein the rubber component further comprises a modified styrene-butadiene copolymer rubber obtained through a solution polymerization.

8. A heavy duty pneumatic tire characterized by using a rubber composition as claimed in claim 1 in a tread.

9. A heavy duty pneumatic tire according to claim 8, which comprises a circumferential-direction belt containing a reinforcing cord arranged substantially in parallel to an equatorial plane of the tire.

* * * * *